(12) United States Patent
Vandersteegen (10) Patent No.: US 11,424,952 B2
(45) Date of Patent: Aug. 23, 2022

(54) STATIC DATA BUS ADDRESS ALLOCATION

(71) Applicant: MELEXIS TECHNOLOGIES NV, Tessenderlo (BE)

(72) Inventor: Peter Vandersteegen, Deurne (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 405 days.

(21) Appl. No.: 15/061,010

(22) Filed: Mar. 4, 2016

(65) Prior Publication Data
US 2016/0261426 A1  Sep. 8, 2016

(30) Foreign Application Priority Data

Mar. 6, 2015 (GB) .................................... 1503801

(51) Int. Cl.
| | |
|---|---|
| G06F 13/42 | (2006.01) |
| H04L 12/40 | (2006.01) |
| H04L 61/5038 | (2022.01) |
| G06F 13/40 | (2006.01) |
| H04L 101/627 | (2022.01) |

(52) U.S. Cl.
CPC ...... H04L 12/40039 (2013.01); G06F 13/404 (2013.01); G06F 13/4282 (2013.01); H04L 12/40006 (2013.01); H04L 12/40195 (2013.01); H04L 61/5038 (2022.05); H04L 2101/627 (2022.05)

(58) Field of Classification Search
CPC ......... H04L 12/40039; H04L 12/40006; H04L 12/40195; H04L 61/2038; H04L 61/6027; G06F 13/404; G06F 13/4282
USPC ........................................................ 710/106
See application file for complete search history.

(56) References Cited

U.S. PATENT DOCUMENTS

| | | |
|---|---|---|
| 4,695,839 A | 9/1987 | Barbu et al. |
| 6,282,668 B1 | 8/2001 | Neudecker |
| 6,438,625 B1 | 8/2002 | Olson |
| 7,328,286 B2 | 2/2008 | Vinnemann |

(Continued)

FOREIGN PATENT DOCUMENTS

| | | |
|---|---|---|
| DE | 102008044777 B4 | 12/2015 |
| EP | 0556549 A1 | 8/1993 |

(Continued)

OTHER PUBLICATIONS

Great Britain Search Report from Application No. GB1503801.1, dated Aug. 24, 2015.

(Continued)

*Primary Examiner* — Chun Kuan Lee
(74) *Attorney, Agent, or Firm* — Workman Nydegger (57) ABSTRACT

The present invention relates to a data bus node integrated circuit comprising at least one static address selection terminal and a detecting circuit for detecting a state of the address selection terminal. The IC also comprises a communication circuit for data communication over a data bus. This circuit is adapted for determining a node address identifier taking the detected state of the at least one static address selection terminal into account. The detecting circuit is adapted for detecting the state of the address selection terminal by determining whether the address selection terminal is in a floating state, a power supply voltage state or a ground voltage state.

17 Claims, 2 Drawing Sheets

(56) References Cited

U.S. PATENT DOCUMENTS

| | | | |
|---|---|---|---|
| 7,793,005 B1* | 9/2010 | Fernald | G06F 1/26 |
| | | | 713/340 |
| 2010/0121537 A1 | 5/2010 | Tanaka | |
| 2010/0332706 A1* | 12/2010 | Hering | G06F 13/4295 |
| | | | 710/106 |
| 2011/0058420 A1* | 3/2011 | Yamada | G11C 8/18 |
| | | | 365/185.09 |
| 2011/0208886 A1* | 8/2011 | Sugiura | H04L 12/403 |
| | | | 710/110 |
| 2012/0020401 A1 | 1/2012 | Itou et al. | |
| 2013/0057339 A1* | 3/2013 | Koudar | G06F 13/4252 |
| | | | 327/565 |
| 2013/0132626 A1* | 5/2013 | Furlan | G06F 13/385 |
| | | | 710/110 |
| 2013/0132628 A1* | 5/2013 | Li | G06F 1/185 |
| | | | 710/300 |
| 2014/0325244 A1* | 10/2014 | Wang | G06F 1/26 |
| | | | 713/300 |

FOREIGN PATENT DOCUMENTS

| | | |
|---|---|---|
| EP | 1284556 A1 | 2/2003 |
| EP | 1455278 B1 | 6/2006 |
| GB | 2353448 A | 2/2001 |
| JP | H0879284 A | 3/1996 |
| WO | 2004068796 A2 | 8/2004 |

OTHER PUBLICATIONS

Great Britain Search Report from Application No. GB1503802.9, dated Sep. 3, 2015.

European Search Report from corresponding European Application No. EP 16 15 7811, dated Mar. 24, 2016.

* cited by examiner

STATIC DATA BUS ADDRESS ALLOCATION

FIELD OF THE INVENTION

The present invention relates to the field of data transmission, such as data transmission over automotive communication bus systems. More specifically it relates to means and methods for individual identification of substantially identical integrated circuit components on a communication bus.

BACKGROUND OF THE INVENTION

The present invention may for example relate to the identification of substantially identical sensor ICs in a vehicle data communication system, e.g. an automotive sensor network. For example, the present invention may relate to vehicle data communication systems, such as CAN, LIN, SENT or other communication systems. For example, car sensor systems may comprise a substantial number of identical ICs on the same bus, e.g. to provide redundancy and safety.

Deterministic communication protocols may require that each integrated circuit (IC) node is uniquely identified. For example, a Unique User Id (UUID) for bus communication purposes may be stored in each IC. IC vendors and sensor system assemblers aim to use identical components, including the IC. Therefore, it is advantageous to provide means and methods to differentiate substantially identical ICs connected to the same data bus, e.g. by the location of the IC defined by the application diagram. This identification also may be required early during assembly of the IC components in a system, e.g. to be used during the end of line calibration of a sensor module system. For example, such end of line calibration may use a deterministic communication protocol different from the communication protocol used in normal operation.

Furthermore, in a sensor network comprising a plurality of identical sensor units, correlating a measurement transmitted over the sensor network to a corresponding sensing location can be particularly important in sensor controlled systems, regardless of whether the communication protocol requires such unique identification. Unique identification of substantially identical nodes can for example be achieved by dynamically assigning identification addresses to the ICs connected to the communication bus.

It is known in the art to use a serial chain connection between the IC devices, e.g. a daisy chain, to determine the position of each device by voltage division such that a unique identification can be assigned to each device. For example, DE 102008044777 and EP 1284556 disclose such arrangements for address allocation. However, such approaches may have the disadvantages of requiring one or more additional wires along the bus for establishing the daisy chain link, and of risking the interruption of the chain when a single component is faulty. The serial connection may thus cause a communication failure of at least the downstream components in the chain with respect to the failure location, and may even cause communication over the entire bus to fail.

It may also be known in the art to statically assign a unique address identifier ID to a node on a communication bus, e.g. via configuration jumpers or dip switches.

SUMMARY OF THE INVENTION

It is an object of embodiments of the present invention to provide good and efficient unique address allocation for an integrated circuit node on a communication bus.

The above objective is accomplished by a method and device according to the present invention.

It is an advantage of embodiments of the present invention that robust static address assignment can be achieved while using the available input and output (I/O) connections, e.g. chip pins, of the integrated circuit node efficiently.

It is an advantage of embodiments of the present invention that an address can be deterministically selected from a large address space, e.g. comprising N possible unique address identifiers, while requiring less than $\log_2(N)$ address selection pins and only requiring a simple integrated circuit component for address determination in the integrated circuit node, e.g. a simple and low cost component. It is furthermore an advantage of such embodiments that address assignment can be fully deterministic.

It is an advantage of embodiments of the present invention that an address can be assigned to the integrated circuit node without requiring a dedicated serial chain between communication nodes. Thus, no additional wires along the bus are needed for establishing a daisy chain link for address assignment. Furthermore, if a communication node on the bus is faulty, a low risk of disruption of other integrated circuit nodes communicating over the same bus is achieved.

It is an advantage of embodiments of the present invention that an easy and simple system assembly comprising a plurality of substantially identically integrated circuit nodes can be achieved while statically assigning a unique user id to each IC.

It is an advantage of embodiments of the present invention that substantially identical ICs can be automatically assigned an address identifier in a communication system based on their particular location in the system, e.g. based on the system wiring or application diagram.

It is an advantage of embodiments of the present invention that substantially identical ICs can be differentiated on a data communication bus by simply applying a different routing to the different pins of the ICs, e.g. without requiring additional components other than a routing configuration, e.g. without requiring additional active electronic components or passive impedance components such as resistors, capacitors or inductors.

In a first aspect, the present invention relates to a data bus node integrated circuit comprising at least one static address selection terminal, a detecting circuit for detecting a state of the at least one static address selection terminal and a communication circuit for receiving and/or transmitting data over a data bus. The communication circuit is adapted for determining a node address identifier taking the detected state of the at least one static address selection terminal into account. The detecting circuit is adapted for detecting the state of the at least one static address selection terminal by determining whether the at least one static address selection terminal is in a floating state, a power supply voltage state or a ground voltage state.

In a data bus node integrated circuit according to embodiments of the present invention, the detecting circuit may comprise a comparator for comparing a voltage potential supplied via the at least one static address selection terminal with respectively a power supply voltage and a ground voltage such as to determine said at least one static address selection terminal as being in a floating state, a power supply voltage state or a ground state.

In a data bus node integrated circuit according to embodiments of the present invention, the detecting circuit may furthermore comprise switching means for controllably connecting and disconnecting the at least one static address selection terminal via a first resistive path to the power supply voltage and for controllably connecting and disconnecting the at least one static address selection terminal via a second resistive path to the ground voltage.

In a data bus node integrated circuit according to embodiments of the present invention, the detecting circuit may comprise a control unit for controlling the switching means such as to compare the electric potential at the or each at least one static address selection terminal with respectively the power supply voltage and the ground voltage.

In a data bus node integrated circuit according to embodiments of the present invention, the communication circuit may be adapted for receiving and/or transmitting data over the data bus in accordance with a first communication protocol using the node address identifier for identification of the data bus node integrated circuit. The communication circuit may furthermore be adapted for receiving and/or transmitting data over this data bus or over a further data bus in accordance with a second communication protocol using a further node address identifier for identification of the data bus node integrated circuit. The communication circuit may be adapted for configuring the further node address identifier by using data received using the first communication protocol, e.g. configuring the further node address identifier taking data received via the first communication protocol into account.

In a data bus node integrated circuit according to embodiments of the present invention, the communication circuit may comprise a storage memory for storing the node address identifier and/or for storing the further node address identifier.

A data bus node integrated circuit according to embodiments of the present invention may furthermore comprise a sensor module for providing at least one sensor measurement value to the communication circuit, the communication circuit being adapted for transmitting the at least one sensor measurement value via the data bus.

A data bus node integrated circuit according to embodiments of the present invention may comprise further switching means for selectively routing either a signal from the at least one static address selection terminal or from an analog signal chain to the comparator, e.g. for switching between routing a signal from the at least one static address selection terminal to the comparator and routing a signal from the analog signal chain to the comparator.

In data bus node integrated circuit according to embodiments of the present invention, the communication circuit may be adapted for transmitting and/or receiving data over the data bus in accordance with a CAN, LIN, SENT or other, possibly proprietary, communication protocol.

A data bus node integrated circuit according to embodiments of the present invention, may furthermore comprise at least one data communication terminal for receiving and/or sending a data communication signal over the data bus.

In a data bus node integrated circuit according to embodiments of the present invention, the detecting circuit may furthermore be adapted for detecting at least one further state of the at least one static address selection terminal.

In a data bus node integrated circuit according to embodiments of the present invention, this at least one further state may be defined by a corresponding predetermined resistance to the ground.

In a second aspect, the present invention also relates to a network system comprising a plurality of data bus node integrated circuits according to an embodiment of the first aspect of the present invention and a data bus for relaying data from and/or to the plurality of data bus node integrated circuits.

In a third aspect, the present invention also relates to a method for statically addressing a plurality of data bus node integrated circuits on a data bus. The method comprises connecting a plurality of data bus node integrated circuits to a data bus, each data bus node integrated circuit comprising at least one static address selection terminal, and electrically connecting the at least one static address selection terminals of the data bus node integrated circuits such as to provide a unique state or unique combination of states on the at least one static address selection terminal of each data bus node integrated circuit. Each static address selection terminal can be in a floating state, a power supply voltage state or a ground voltage state. The method further comprises detecting the state of the at least one static address selection terminal in each data bus node integrated circuit, and determining a node address identifier in each data bus node integrated circuit taking the detected state of the at least one static address selection terminal into account.

A method according to embodiments of the present invention may also comprise storing the node address identifier for each data bus node integrated circuit in a storage memory of each data bus node integrated circuit.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other aspects of the invention will be apparent from and elucidated with reference to the embodiment(s) described hereinafter.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATED EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to an "electric connection terminal" or simply to a "terminal", reference is made to a bond pad, pin or other electrically conductive element of an integrated circuit device for establishing an electrical connection between the integrated circuit device and an external component for integrating the integrated circuit device into a larger system. Such terminals, e.g. pad or pin, may be configured to receive a reference voltage or current supply, to receive electric signals in analog or digital form from the system and/or to send electric signals in analog or digital form to the system. The larger system may for example refer to a printed circuit board (PCB) for accommodating the integrated circuit device, or to any larger system of which the integrated circuit device is a functional part, e.g. a vehicle comprising for example sensors, controllers and actuators integrated in an operational control framework.

In a first aspect, the present invention relates to a data bus node integrated circuit comprising at least one static address selection terminal, a detecting circuit for detecting a state of the at least one static address selection terminal, and a communication circuit for receiving and/or transmitting data over a data bus. The communication circuit is furthermore adapted for determining a node address identifier taking the detected state of the at least one static address selection terminal into account. The detecting circuit is adapted for detecting the state of the at least one static address selection terminal by determining whether the at least one static address selection terminal is in a floating state, a power supply voltage state or a ground voltage state.

Figure 1:
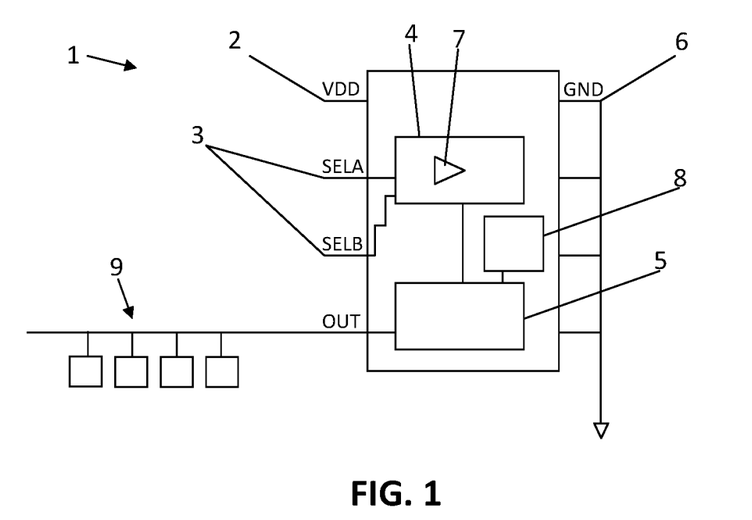
FIG. 1 shows an integrated circuit device according to embodiments of the present invention.
Figure 2:
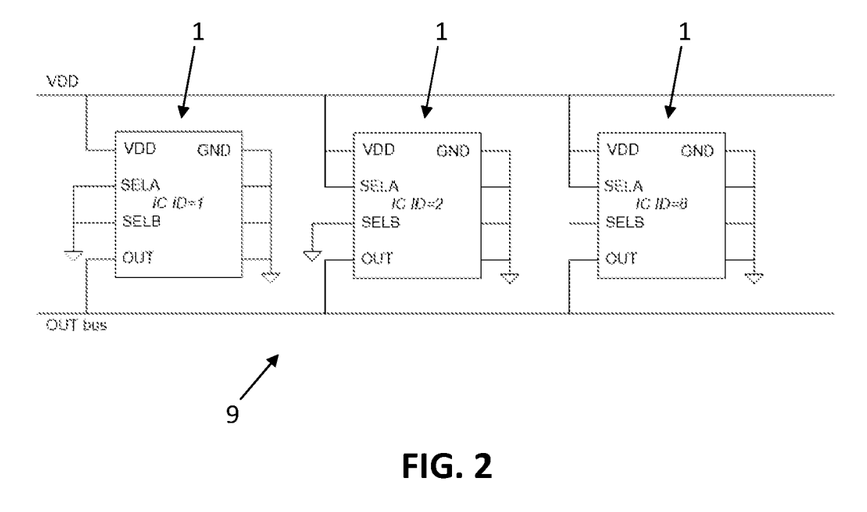
FIG. 2 shows plurality of integrated circuit devices according to embodiments of the present invention connected to a common data bus.

Referring to FIG. 1, a data bus node integrated circuit 1 according to embodiments of the present invention is shown. This bus node integrated circuit 1 may for example be adapted for communicating data over a data bus 9. For example, the data bus 9 may be configured to transmit data from and/or to a plurality of substantially identical data bus node integrated circuits 1, as illustrated in FIG. 2. For example, bus node integrated circuit devices 1 according to embodiments of the present invention may be adapted for communicating data over a vehicle data communication bus, such as a CAN, LIN, SENT or other, possibly proprietary, communication bus.

The integrated circuit device 1 may comprise a plurality of electric connection terminals, e.g. for receiving or sending electrical signals from or to electrical or electronic elements connected to the integrated circuit device. These electric connection terminals may provide power-related and/or signal-related functions. In operation, these terminals may mate with corresponding contacts or connectors having corresponding functions of a larger system. The electric connection terminals may comprise male connectors, e.g. pins, female socket connectors or contact connectors. Regardless of gender-type of these connectors, the electric connection terminals may have well-defined functions as may be defined by a pin-out specification. The data bus node integrated circuit 1 may comprise at least one power supply terminal 2 and at least one ground terminal 6 for respectively receiving a power supply voltage VDD and a ground voltage GND. Thus, the plurality of electrical connection terminals may comprise a positive power supply terminal and a negative power supply terminal for receiving a supply voltage pair from an external power supply. The plurality of electric connection terminals may also comprise at least one data communication terminal for receiving and/or sending a data communication signal OUT, e.g. for sending data to the data bus 9 and/or for receiving data from the data bus 9, for example a CAN, LIN or SENT signal line. However, the at least one data communication terminal for receiving and/or sending a data communication signal OUT may also be the at least one power supply terminal. For example, the data bus may be a two-wire protocol, e.g. allowing communication via the potential difference between the VDD and GND connection. For example, a bus controller may transmit data by voltage modulation of VDD and/or the integrated circuit may transmit data by current modulation over VDD.

For example, a substantially constant potential difference may be provided during operation between the power supply terminal 2 and the ground terminal 6, such as a difference lower than 12 V, e.g. a difference of 3.30 V or a difference of 5 V, for powering the integrated circuit device 1 while in operation. Where reference is made in this description to a power supply voltage and ground voltage pair, e.g. where reference is made to VDD and GND, it shall be understood that this refers to a pair of externally provided substantially constant voltage potentials, e.g. a direct current (DC) voltage supply pair. However, "power supply voltage" or "VDD" may equally refer to an ancillary power supply. For example, an integrated circuit chip 1 may receive multiple input power supplies, e.g. a 3V and a 5V supply, and VDD does not necessarily refer to the nominal power supply voltage of the majority of components of the integrated circuit. For example, the "power supply voltage" or "VDD" may equally refer to a secondary power input, or may refer to a decoupled supply voltage VDEC.

The data bus node integrated circuit 1 comprises at least one static address selection terminal 3, e.g. the plurality of electrical connection terminals may comprise at least one static address selection terminal 3. The at least one static address selection terminal 3 may be adapted for receiving a corresponding at least one externally supplied address selection potential, e.g. a power supply voltage VDD or a ground supply voltage GND. The at least one static address selection terminal 3 may also be adapted for being in a floating state while the device is in operation, e.g. in a state in which a high impedance substantially electrically isolates the terminal from both the power supply voltage VDD and the ground supply voltage GND. For example, the at least one static address selection terminal 3 may comprise at least one three-state pin. However, the at least one static address selection terminal 3 may also be adapted for being in one or more further states, e.g. a further state characterized by a predetermined resistance to the ground, e.g. by a predetermined electrical resistance value of a pull-down resistor that, when externally connected to the at least one static address selection terminal 3, brings the at least one static address selection terminal 3 in this further state.

For example, the integrated circuit 1 may be adapted for installation on a printed circuit board (PCB). On this PCB, hardware jumpers may be provided to connect one or more pins of the IC, corresponding to the at least one static address selection terminal 3, to either a ground reference voltage level, to a supply voltage level, or to leave the pin floating. Thus, a hardware address can be internally determined by the IC, as configured by the plurality of pins of the IC. Furthermore, instead of jumpers or switches, the PCB may provide a hardwired configuration for the at least one static address selection terminal, which advantageously provides a reliable and robust configuration means that is easy to implement and cost-effective. Furthermore, the PCB may comprise a plurality of installation locations for a plurality of integrated circuits 1 according to embodiments of the present invention, e.g. a plurality of sockets for receiving these ICs, in which each location has a different, e.g. a unique, hardwired configuration provided on the PCB for the at least one static address selection terminal for an IC 1 when installed at that location. It is an advantage of embodiments of the present invention that a simple system assembly can be achieved and a unique user id can be statically assigned to each IC. This may be particularly advantageous for sensor systems, e.g. having multiple identical sensor ICs on a single data bus, for example sensor networks for car systems. In such systems, a fully deterministic identification mechanism may be required or highly preferred, while a simple means for providing such identification is also advantageous, e.g. for reasons of cost.

However, even though such passive wiring or routing has a clear advantage, embodiments of the present invention may also enable the selection of a further range of addresses by also allowing at least one further state for selecting an address component on a static address selection terminal, e.g. a further state characterized by a predetermined resistance to the ground. Although this may require a resistor in addition to simple wiring, the address space can be further extended without requiring the use of more terminals. Furthermore, the addresses corresponding to the floating-VDD-GND states or state combinations can be used first, thereby only requiring additional resistors when the basic address space has been filled.

The data bus node integrated circuit 1 also comprises a detecting circuit 4 for detecting a state of the at least one static address selection terminal 3 by determining whether the at least one static address selection terminal is in a floating state, a power supply voltage state or a ground voltage state. The detecting circuit 4 may be adapted for detecting at least one floating state of each static address selection terminal 3, for detecting a power supply voltage VDD at each static address selection terminal 3 and for detecting a ground supply voltage GND at each static address selection terminal 3. In particular embodiments of the present invention, the detecting circuit 4 may also be adapted for detecting at least one further state of the at least one static address selection terminal 3, e.g. a further state characterized by a predetermined resistance to the ground, e.g. by a predetermined electrical resistance value of a pull-down resistor that, when externally connected to the at least one static address selection terminal 3, brings the at least one static address selection terminal 3 in this further state.

The detecting circuit 4 may be adapted for outputting a signal or plurality of signals representing the state of each static address selection terminal 3, e.g. in the form of at least one digital signal to be provided to a communication circuit 5. The communication circuit 5 may comprise components which are not only involved in communication, but also ancillary components related to communication functions, e.g. the communication circuit 5 may comprise blocks directly involved in the communication exchange and/or blocks indirectly related to the communication function. For example, the detecting circuit 4 may comprise a voltage comparison means for comparing a voltage potential supplied through the at least one static address selection terminal 3 with each of a positive power supply voltage and a negative power supply voltage such as to determine the state of the at least one static address selection terminal as either positive, negative or floating. However, in particular embodiments of the present invention, the voltage comparison means may also be adapted for determining the state of the at least one static address selection terminal as either positive, negative, floating or any predetermined further state.

The data bus node integrated circuit 1 furthermore comprises a communication circuit 5 for receiving and/or transmitting data over a data bus 9.

This communication circuit 5 is also adapted for determining a node address identifier, e.g. an identifier for uniquely identifying the integrated circuit device 1 on the data bus 9, taking the detected state of the at least one static address selection terminal 3 into account. The communication circuit 5 may comprise an address assignment unit for determining the node address identifier based on the states of each of the at least one static address selection terminal. For example, each state of the static address selection terminal (where only one such terminal is provided), or each unique combination of states of the static address selection terminals (where multiple such terminals are provided), may be mapped onto a corresponding unique address identifier by the communication unit 5. For example, in case the IC 1 comprises two static address selection terminals SELA and SELB, such as illustrated in FIG. 1 and FIG. 2, an exemplary mapping may be as follows:

| SELA | SELB | ID |
|---|---|---|
| GND | GND | 1 |
| VDD | GND | 2 |
| Floating | GND | 3 |
| GND | VDD | 4 |
| VDD | VDD | 5 |
| Floating | VDD | 6 |
| GND | Floating | 7 |
| VDD | Floating | 8 |
| Floating | Floating | 9 |

The communication circuit 5 may also comprise a storage memory for storing the node address identifier. Furthermore, this storage memory may be a persistent memory, e.g. may be an EEPROM memory or a flash memory. Thus, the communication circuit 5 may be adapted for determining the address identifier only during an initial installation or configuration cycle, e.g. during an end-of-line calibration after assembly of a system in which the IC is installed, e.g. in an end-of-line calibration of a sensor network.

Furthermore, an end of line calibration may use a deterministic communication protocol different from the communication protocol used in normal operation. The data bus node integrated circuit 1 may thus comprise a communication circuit 5 for receiving and/or transmitting data over a data bus 9 in accordance with the communication protocol used in normal operation, e.g. a LIN or SENT data communication protocol. For example, normal operation may refer to the transmission of sensor data over the communication network. Furthermore, the communication circuit 5 may be adapted for determining a node address identifier taking the detected state of the at least one static address selection terminal 3 into account, in which this node address identifier may not be used for the communication protocol during normal operation, but only for an initial identification of the integrated circuit 1 during an end-of-line procedure, e.g. a calibration during manufacture of a larger system comprising the integrated circuit 1. Thus, the deterministic communication protocol may be used to determine the initial identification of the integrated circuit, and, for example, another node address identifier may be programmed, e.g. stored in a storage memory of the integrated circuit 1 for use by the communication protocol used in normal operation. Thus, the deterministic communication protocol may refer to, for example, a proprietary protocol for end-of-line calibration of the integrated circuit. Therefore, a UUID node address identifier during start-up or calibration, e.g. a hardware-based UUID in accordance with embodiments of the present invention, may differ from a UUID programmed during start-up or calibration. For example, an End of Line Calibration, e.g. using a proprietary deterministic communication protocol, may comprise the writing of the a UUID to be used for normal communication, e.g. a UUID for SENT or LIN communication, in the chip's memory.

For example, a communication circuit 5 of a data bus node integrated circuit 1 according to embodiments of the present invention may be adapted for receiving and/or transmitting data over the data bus 9 in accordance with a first communication protocol, which may be a deterministic communication protocol, e.g. an end-of-line calibration protocol. For example, such end-of-line calibration protocol may be a proprietary protocol, e.g. may be provided specifically by the manufacturer for calibration and initialization of the integrated circuit or circuits in a system without necessarily conforming with an industry-wide communication standard. This first communication protocol may use the node address identifier, determined as described hereinabove via the at least one address selection terminal, for identification of the data bus node integrated circuit. The communication circuit 5 may also be adapted for receiving and/or transmitting data over the data bus 9 in accordance with a second communication protocol, such as a standard communication protocol, e.g. a LIN or SENT protocol. For this second communication protocol, the communication circuit 5 may be adapted for using a further node address identifier for identification of the data bus node integrated circuit, in which the communication circuit 5 may be adapted for configuring the further node address identifier by using data received using said first communication protocol. For example, the data bus node integrated circuit may comprise a storage memory for storing the further node address identifier, which may for example be received in an initial system setup calibration, e.g. from a system control node, via the first communication protocol. It shall also be clear to the person skilled in the art that the first and the second communication protocol do not necessarily use the same set of chip terminals to connect to the data bus 9, e.g. the data bus 9 may refer to two distinct communication bus systems to which the integrated circuit can connect via two separate sets of terminals, or may refer to substantially the same communication bus system to which the IC may connect via a single set of terminals, or may refer to distinct communication bus systems to which the IC may connect via a single set of terminals depending on a configuration state of the IC and/or a larger system in which it participates.

While a unique address identifier for a data bus node could be configured bitwise, by setting bits of the identifier by connecting corresponding input terminals of the node to either a reference voltage level, e.g. ground, or leaving such input terminals a floating state, embodiments of the present invention provide an advantageous configuration means due to a good pin-out allocation efficiency. The configuration of a unique address identifier is performed by setting input terminals of the node, e.g. via integrated circuit (IC) pins or pads for connecting to a socket on a print circuit board (PCB), to either a high voltage (Vdd), a low voltage (Vss, GND) or a floating state. It is an advantage of embodiments that such a three-state input can be easily provided by using standard wiring and routing techniques, e.g. on the mother card PCB for the node by simple electrical routing. Particularly, no passive or active electronic components are required to configure the IC node at a particular location in the application diagram, other than appropriate electrical conductive wiring or routing. Furthermore, it is an advantage of embodiments that the available terminal connectors of the node can be efficiently used. For example, where four pins connecting to a dip switch or jumper header can be used to configure $2^4=16$ different addresses, in embodiments according to the present invention, four pins can be used to configure $3^4=81$ different addresses. Furthermore, in embodiments that support further address selection states, e.g. by connecting a resistor to the pin, in which the resistive value of the resistor encodes a predetermined further state, an even wider range of addresses can be selected by a small number of terminals for address selection.

Figure 3:
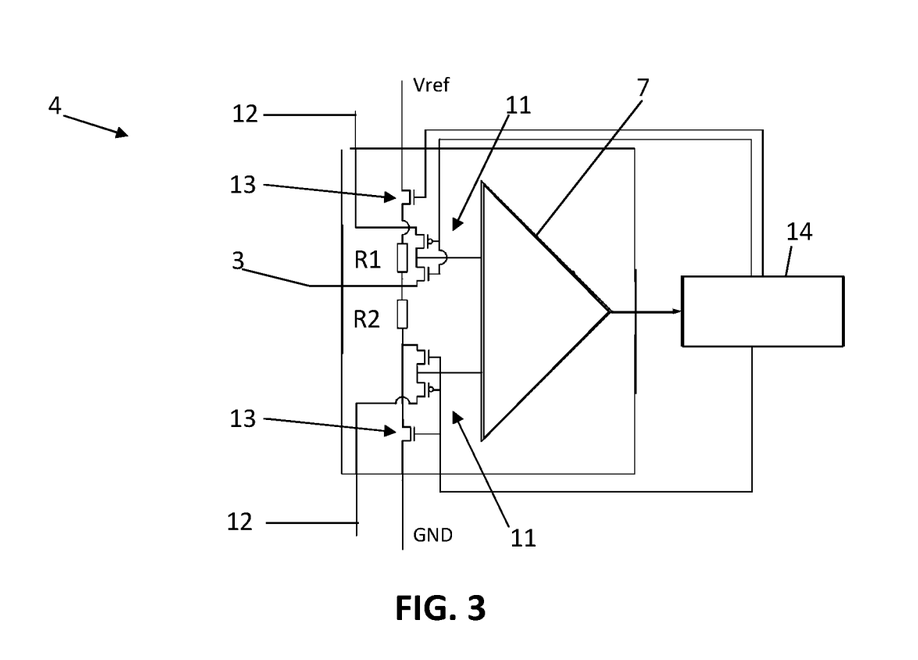
FIG. 3 shows an exemplary implementation of a detecting circuit in an integrated circuit device according to embodiments of the present invention.

The detecting circuit 4 may comprise a comparator 7 for comparing a voltage potential supplied via the at least one static address selection terminal 3 with respectively a power supply voltage VDD and a ground voltage GND such as to determine the at least one static address selection terminal 3 as being in a floating state, a power supply voltage state or a ground state. For example, a power supply terminal 2 and a ground terminal 6 may receive respectively this power supply voltage VDD and this ground voltage GND.

As shown in FIG. 3, the detecting circuit may comprise a comparator 7, such as a high-gain differential amplifier, an operational amplifier or other known means for comparing a pair of electrical potentials or currents. The comparator 7 may be an analog to digital converter (ADC) or may form a part of an analog to digital converter. For example, the comparator may comprise one or more bit elements of a multi-bit ADC, or may be a one bit ADC, or may form a part of such ADCs. For example, the circuit 1 may comprise switching means 13 for connecting and disconnecting the at least one static address selection terminal 3 via a resistive path to a reference electrical potential Vref, e.g. respectively over a resistor R1 and a resistor R2, and for connecting and disconnecting the at least one static address selection terminal 3 via a resistive path to a ground electrical potential GND.

The detecting circuit 4 may also comprise a control unit 14, e.g. a microcontroller or finite state control circuit, for controlling the switching means 13 such as to compare the or each at least one static address selection terminal 3 with respectively the reference electrical potential Vref and the ground electrical potential GND, and for receiving a comparison value for each at least one static address selection terminal with each of the power supply voltage Vref and the ground supply voltage GND. These comparison values may be provided by the comparator 7 as digital values. This control unit 14 may also form part of the communication circuit 5, e.g. may be adapted for determining a node address identifier taking the detected state of the at least one static address selection terminal 3, e.g. in the form of said digital values, into account.

The data bus node integrated circuit 1 may comprise a sensor module 8 adapted for providing at least one sensor measurement value to the communication circuit 4. The communication circuit 4 may be adapted for transmitting the at least one sensor measurement value via the data bus 9. For example, the data bus node integrated circuit 1 may be a sensor chip for transmitting sensor data over a data bus, e.g. an automotive sensor network bus. The sensor module 8 may comprise a transducer or sensing element for generating a signal representative of a physical quantity, for example a pressure or a temperature.

It is a particular advantage of embodiments of the present invention, for example embodiments which comprise a sensor module 8, that a comparator 7 may be connected to switching means 11 adapted for selectively routing either a signal from the at least one static address selection terminal 3 or from an analog signal chain 12, e.g. via a pair of internal connections to an analog signal chain, to the comparator 7. For example, the analog signal chain 12 may be connected to the sensor module 8, e.g. for conducting the at least one sensor measurement value in an analog form. Therefore, it is also an advantage of embodiments of the present invention that an efficient use of available connection terminals of the integrated device can be achieved, e.g. an address out of a large address space can be selected using only few pins, without requiring complex or expensive additional components. For example, in a prior art sensor IC having bus node capabilities, an analog-to-digital converter comprising a comparator 7 may typically already be present for reading out signals provided through an analog signal chain, e.g. for digitizing analog sensor readout signals, such that embodiments of the present invention may only imply a small additional cost, e.g. in terms of circuit real-estate, volume, power consumption and/or component cost.

A control unit 14 of the detecting circuit 4 may also be adapted for controlling the switching means 14 such as to determine the node address identifier in an address allocation mode, e.g. in a start-up or configuration phase during operation, and to process other analog values into digital form in a data acquisition mode, e.g. after the address was successfully determined.

In a second aspect, the present invention also relates to a network system, e.g. a sensor network such as a vehicle sensor network, comprising a plurality of data bus node integrated circuits according to embodiments of the first aspect of the present invention. This network system further comprises a data bus 9 for relaying data from and/or to the plurality of data bus node integrated circuits 1. This data bus 9 may be for example a CAN, LIN or SENT data bus.

In a third aspect, the present invention may also relate to a method for statically addressing a plurality of data bus node integrated circuits on a data bus. The method comprises connecting a plurality of data bus node integrated circuits to a data bus, each data bus node integrated circuit comprising at least one static address selection terminal. The method further comprises electrically connecting the at least one static address selection terminals of the data bus node integrated circuits such as to provide a unique state or unique combination of states on the at least one static address selection terminal of each data bus node integrated circuit, wherein each static address selection terminal can be in a floating state, a power supply voltage state or a ground voltage state. The method further comprises detecting the state of the at least one static address selection terminal in each data bus node integrated circuit, and determining a node address identifier in each data bus node integrated circuit taking said detected state of the at least one static address selection terminal into account.

Figure 4:
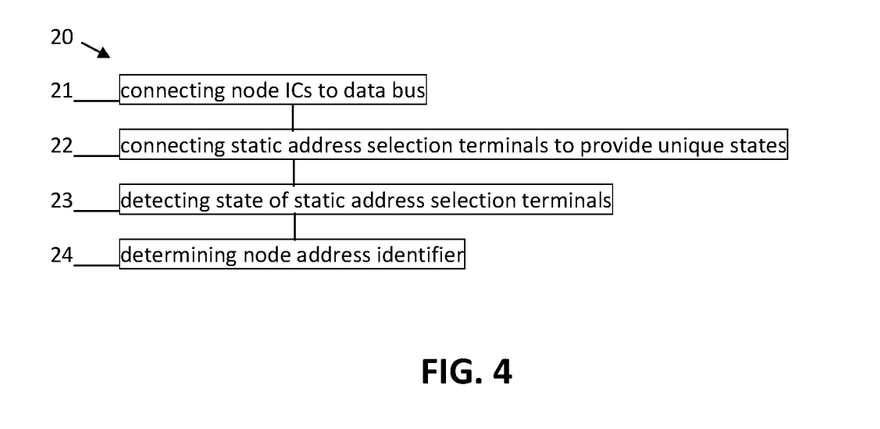
FIG. 4 is a flow chart of an exemplary method according to embodiments of the present invention.

Referring to FIG. 4, a flow chart illustrating an exemplary method 20 according to embodiments of the present invention is shown. This method 20 for statically addressing a plurality of data bus node integrated circuits 1 on a data bus 9 comprises connecting 21 a plurality of data bus node integrated circuits 1 to a data bus 9, for example a plurality of data bus node ICs 1 according to the first aspect of the present invention to a data bus 9, such as a LIN, SENT or CAN data bus. Each data bus node integrated circuit 1 comprises at least one static address selection terminal 3, e.g. as explained hereinabove in relation to the first aspect of the present invention. The method further comprises electrically connecting 22 the at least one static address selection terminals 3 of the data bus node integrated circuits 1 such as to provide a unique state, e.g. in case a single static address selection terminal 3 is provided per data bus node integrated circuit 1, or a unique combination of states, e.g. in case a plurality of selection terminals 3 is provided per IC 1, on the at least one static address selection terminal of each data bus node integrated circuit, e.g. unique in the sense that no two ICs 1 on the same data bus 9 have the same state configuration of the at least one static address selection terminal 3.

Each static address selection terminal 3 of each IC 1 can be in a floating state, a power supply voltage state or a ground voltage state.

The method 20 further comprises detecting 23 the state of the at least one static address selection terminal 3 in each data bus node integrated circuit 9, e.g. this detecting may comprise an automatic determining by the IC 1 whether the at least one static address selection terminal 3 is in a floating state, a power supply voltage state or a ground voltage state. The method further comprises determining 24 a node address identifier in each data bus node integrated circuit taking the detected state of the at least one static address selection terminal for each integrated circuit 1 into account.

The method 20 may also comprise storing the node address identifier for each data bus node integrated circuit in a storage memory of each data bus node integrated circuit. For example, the node address identifier may be stored in a non-volatile memory, such that the static address determination method may only be performed once, e.g. upon installation of the ICs on the data bus, such as in a calibration phase of a system assembly process. Furthermore, the method may relate to an end of line calibration using a deterministic communication protocol different from the communication protocol for normal operation, as described in detail hereinabove. For example, the deterministic communication protocol may refer to a proprietary protocol for end-of-line calibration of the integrated circuit. Thus, a UUID node address identifier during start-up or calibration, e.g. a hardware-based UUID in accordance with embodiments of the present invention, may differ from a UUID programmed during start-up or calibration, e.g. received from a controller, e.g. an end-of-line calibration controller for configuring the system in which the integrated circuit is installed.

For example, a customer may assemble a system, e.g. an automotive sensor network, for example a system comprising integrated circuits according to an embodiment of the present invention. This customer may perform an end-of-line calibration flow, for example using a proprietary protocol of IC vendor. In this calibration, a method according to embodiments may be used for deterministically determining the installation location in the system for each IC. The end-of-line flow then may determine a UUID for each IC, taking the installation location into account. This UUID may for example be stored in a memory element of each IC. This UUID and the deterministic hardware ID are not necessarily identical, although specific embodiments of the present invention may use such identity relation for simplicity. The system may then use, during normal operation, e.g. after end-of-line calibration, the UUID for communication over a data bus, e.g. for CAN, LIN or SENT communication.

The invention claimed is:

1. A network system comprising:
   a plurality of data bus node integrated circuits; and
   a data bus for relaying data from or to said plurality of data bus node integrated circuits,
   wherein the data bus node integrated circuits are connected in parallel to the data bus, and
   wherein each of said data bus node integrated circuits comprises
      at least one data communication terminal connecting the respective data bus node integrated circuit to the data bus,
      a plurality of static address selection terminals separate from said at least one data communication terminal and including a first static address selection terminal and a second static address selection terminal,
      a detecting circuit that detects a state of each of the plurality of static address selection terminals including detecting a state of the first static address selection terminal and detecting a state of the second static address selection terminal, wherein each of the plurality of static address selection terminals is configurable in a floating state, a power supply voltage state, or a ground voltage state, and
      a communication circuit for receiving and/or transmitting data over the data bus, wherein the communication circuit is programmed to assign a unique node address identifier to each possible combination of detectable power supply voltage state, ground state and floating state of the plurality of static address selection terminals of the corresponding data bus node integrated circuit, and wherein the communication circuit selects the node address identifier assigned to said detected states of the plurality of static address selection terminals including the detected state of the first static address selection terminal and the detected state of the second static address selection terminal so as to identify the respective data bus node integrated circuit in said network system when receiving and/or transmitting data over the data bus,
   wherein said detecting circuit detects said states of the plurality of static address selection terminals including the first static address selection terminal and the second static address selection terminal by said detecting circuit
      determining whether the first static address selection terminal is in the floating state,
      determining whether the first static address selection terminal is in the power supply voltage state,
      determining whether the first static address selection terminal is in the ground voltage state,
      determining whether the second static address selection terminal is in the floating state,
      determining whether the second static address selection terminal is in the power supply voltage state, and
      determining whether the second static address selection terminal is in the ground voltage state,
   wherein the static address selection terminals configured in the power supply voltage state are connected to an externally provided, static power supply voltage,
   wherein the static address selection terminals configured in the ground voltage state are connected to an externally provided, static ground voltage, and
   wherein the static address selection terminals configured in the floating state are substantially electrically isolated from both the static power supply voltage and the static ground voltage.

2. The network system according to claim 1, wherein said detecting circuit of each of said data bus node integrated circuits comprises a comparator that respectively compares a voltage potential supplied via each of the static address selection terminals with respectively a power supply voltage and a ground voltage to determine each of the static address selection terminals as being in the floating state, the power supply voltage state, or the ground state by
   comparing the voltage potential supplied via each of the static address selection terminals with the power supply voltage to determine whether each of said static address selection terminals is in said power supply voltage state,
   comparing said voltage potential supplied via each of the static address selection terminals with the ground voltage to determine whether each of said at static address selection terminals is in said ground state, and comparing said voltage potential supplied via each of the static address selection terminals with both said power supply voltage and with said ground voltage to determine whether each of said static address selection terminals is in said floating state.

3. The network system according to claim 2, wherein said detecting circuit of each of said data bus node integrated circuits furthermore comprises switching means for respectively controllably connecting and disconnecting each of the static address selection terminals via a first resistive path to the power supply voltage and for respectively controllably connecting and disconnecting each of the static address selection terminal via a second resistive path to the ground voltage.

4. The network system according to claim 3, wherein said detecting circuit of each of said data bus node integrated circuits further comprises a control unit that respectively controls the switching means to respectively compare the electric potential at each of the static address selection terminals with respectively the power supply voltage in a first configuration of the switching means and the ground voltage in a second configuration of the switching means.

5. The network system according to claim 1, wherein said communication circuit of each of said data bus node integrated circuits is adapted for receiving and/or transmitting data over said data bus in accordance with a first communication protocol using said node address identifier for identification of the data bus node integrated circuit, said communication circuit furthermore being adapted for receiving and/or transmitting data over said data bus in accordance with a second communication protocol using a further node address identifier for identification of the data bus node integrated circuit, wherein said communication circuit is adapted for configuring the further node address identifier by using data received using said first communication protocol.

6. The network system according to claim 5, wherein the communication circuit of each of said data bus node integrated circuits comprises a storage memory for storing said node address identifier and/or for storing said further node address identifier.

7. The network system according to claim 1, wherein each of said data bus node integrated circuits further comprises a sensor module for providing at least one sensor measurement value to the communication circuit, said communication circuit being adapted for transmitting the at least one sensor measurement value via the data bus.

8. The network system according to claim 7,
wherein said detecting circuit of each of said data bus node integrated circuits comprises a comparator for respectively comparing a voltage potential supplied via each of the static address selection terminals with respectively a power supply voltage and a ground voltage to respectively determine each of said static address selection terminals as being in a floating state, a power supply voltage state or a ground state, and
wherein the data bus node further comprises further switching means for respectively, selectively routing either a signal from each of the static address selection terminals or from an analog signal chain to the comparator.

9. The network system according to claim 1, wherein the communication circuit of each of said data bus node integrated circuits is adapted for transmitting and/or receiving data over data bus in accordance with a CAN, LIN, SENT or other communication protocol.

10. The system according to claim 1, wherein said detecting circuit of each of said data bus node integrated circuits is furthermore adapted for respectively detecting at least one further state of each of the static address selection terminals.

11. The network system according to claim 10, wherein said at least one further state is defined by a corresponding predetermined resistance to the ground.

12. The network system according to claim 1, wherein in the floating state a high-impedance electrically isolates each of the status address selection terminals from both a power supply voltage and a ground voltage.

13. The network system according to claim 1, wherein said detecting circuit of each of said data bus node integrated circuits is further adapted to detect at least one further state of the first static address selection terminal by a predetermined electrical resistance value of a pull-down resistor.

14. A method for statically addressing a plurality of data bus node integrated circuits on a data bus, the method comprising:
providing a plurality of data bus node integrated circuits, each of said data bus node integrated circuits comprising a plurality of static address selection terminals including a first static address selection terminal and a second static address selection terminal,
connecting the plurality of data bus node integrated circuits in parallel to a data bus by connecting at least one data communication terminal of each of said data bus node integrated circuits, separate from the plurality of static address selection terminals of the respective data bus node integrated circuit, to the data bus,
electrically connecting the static address selection terminals of the data bus node integrated circuits to provide a unique state or unique combination of states on each of the static address selection terminals of each data bus node integrated circuit, wherein each of the static address selection terminals can respectively be connected to an externally provided power supply voltage in a power supply state, connected to an externally provided ground voltage in a ground state, or substantially electrically isolated from both the power supply voltage and the ground voltage in a floating state,
detecting said state of each of the plurality of static address selection terminals in each data bus node integrated circuit including detecting a state of the first static address selection terminal and detecting a state of the second static address selection terminal by
detecting whether the first static address selection terminal in each data bus node integrated circuit is in the floating state,
detecting whether the first static address selection terminal in each data bus node integrated circuit is in the power supply voltage state,
detecting whether the first static address selection terminal in each data bus node integrated circuit is in the ground voltage state,
determining whether the second static address selection terminal is in the floating state,
determining whether the second static address selection terminal is in the power supply voltage state, and
determining whether the second static address selection terminal is in the ground voltage state, and
associating a unique node address identifier with each possible combination of detectable power supply voltage state, ground state and floating state of the plurality of static address selection terminals corresponding to each data bus node integrated circuit, determining the node address identifier of the respective data bus node integrated circuit associated with said detected states of the plurality of static address selection terminals including the detected state of the first static address selection terminal and the detected state of the second static address selection terminal for communication over the data bus.

15. The method according to claim 14, furthermore comprising storing said node address identifier for each data bus node integrated circuit in a storage memory of each data bus node integrated circuit.

16. The method according to claim 14, wherein in the floating state a high-impedance electrically isolates each of the status address selection terminals from both a power supply voltage and a ground voltage.

17. The method according to claim 14, further comprising receiving and/or transmitting data over the data bus by a communication circuit, wherein the communication circuit determines the node address identifier of the respective data bus node integrated circuit.

* * * * *